(12) United States Patent
Lee

(10) Patent No.: US 9,900,103 B1
(45) Date of Patent: Feb. 20, 2018

(54) OPTICAL TRANSCEIVER HAVING AN INTERFACE CIRCUIT WITH A ROUTING CAPABILITY

(71) Applicant: Alcatel-Lucent USA Inc., Murray Hill, NJ (US)

(72) Inventor: Sian Chong J. Lee, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/351,663

(22) Filed: Nov. 15, 2016

Related U.S. Application Data

(60) Provisional application No. 62/416,212, filed on Nov. 2, 2016.

(51) Int. Cl.
*H04B 10/00* (2013.01)
*H04B 10/40* (2013.01)
(Continued)

(52) U.S. Cl.
CPC ........... *H04B 10/40* (2013.01); *H04B 10/801* (2013.01); *H04J 14/0223* (2013.01);
(Continued)

(58) Field of Classification Search
USPC ................................. 398/135–139
See application file for complete search history.

(56) References Cited

U.S. PATENT DOCUMENTS 5,706,277 A * 1/1998 Klink ................... H04B 10/032
370/220
6,229,788 B1 * 5/2001 Graves ................. H04L 49/205
370/230
(Continued)

FOREIGN PATENT DOCUMENTS

WO 2016053979 A2 4/2016

OTHER PUBLICATIONS

NGA, Nguyen T. H., et al., "10 Gbps/ch Full-Duplex Optical Link Using a Single-Fiber Channel for Signal Transmission," IEEE Photonics Technology Letters, vol. 26, No. 6, 2014, pp. 609-612.
(Continued)

*Primary Examiner* — Agustin Bello
(74) *Attorney, Agent, or Firm* — Medelsohn Dunleavy, P.C.; Yuri Gruzdkov

(57) ABSTRACT

We disclose a transceiver module having two optical transceivers, each connectable to a different respective optical line, and a pluggable electrical connector that can be mated with a matching electrical connector in a connection slot of the host network device. The transceiver module also has an electrical interface circuit that can transfer data between the optical transceivers and the host network device in a manner that provides a route for transferring data between two optical transceivers without crossing the electrical connectors. This architecture advantageously enables the optical-line rates to not be limited by the electrical data rate of data transfer through the electrical connectors. In some embodiments, the transceiver module is configurable in a manner that can change the optical-line rates of the optical transceivers and/or the electrical data rate. The latter feature enables the transceiver module to be compatible with both older and newer network devices.

26 Claims, 6 Drawing Sheets

(51) Int. Cl.
| | |
|---|---|
| *H04B 10/80* | (2013.01) |
| *H04Q 11/00* | (2006.01) |
| *H04J 14/02* | (2006.01) |
| *H04L 12/865* | (2013.01) |

(52) U.S. Cl.
CPC ...... *H04Q 11/0066* (2013.01); *H04L 47/6275* (2013.01); *H04Q 11/0003* (2013.01); *H04Q 2011/0009* (2013.01); *H04Q 2011/0047* (2013.01)

(56) References Cited

U.S. PATENT DOCUMENTS

| | | | | |
|---|---|---|---|---|
| 6,944,404 | B2* | 9/2005 | Lange | H04J 14/02 398/135 |
| 7,134,796 | B2* | 11/2006 | Anderson | H04B 10/50 385/134 |
| 7,317,733 | B1* | 1/2008 | Olsson | H04J 3/047 370/466 |
| 7,373,087 | B2* | 5/2008 | Shi | H04B 10/25133 398/147 |
| 7,469,103 | B2* | 12/2008 | Binetti | H04J 14/0201 398/67 |
| 7,471,897 | B1* | 12/2008 | Theodoras, II | H04B 10/035 398/135 |
| 7,551,850 | B2* | 6/2009 | Alana | H04Q 11/0062 398/2 |
| 7,680,421 | B2* | 3/2010 | Bothwell | H04B 10/2581 379/286 |
| 7,889,988 | B2* | 2/2011 | Tazawa | H04L 43/50 398/139 |
| 7,941,053 | B2* | 5/2011 | Dallesasse | H04B 10/40 398/135 |
| 7,995,598 | B2* | 8/2011 | Astigarraga | G06F 11/325 370/419 |
| 8,075,199 | B2* | 12/2011 | Losio | H04L 49/40 385/92 |
| 8,265,482 | B2* | 9/2012 | Burrell | H04L 12/413 398/135 |
| 8,406,630 | B2* | 3/2013 | Hinderthur | H04J 14/0227 370/241 |
| 8,483,565 | B2* | 7/2013 | Elbers | H04J 14/02 385/24 |
| 8,571,416 | B2 | 10/2013 | Grobe | |
| 8,655,192 | B2 | 2/2014 | Osawa et al. | |
| 8,705,955 | B2* | 4/2014 | Grobe | H04J 14/0282 398/1 |
| 8,774,639 | B2* | 7/2014 | Tang | H04B 10/40 398/138 |
| 8,805,183 | B2* | 8/2014 | Dvir | H04B 10/071 398/10 |
| 8,807,846 | B2 | 8/2014 | Hung et al. | |
| 8,837,951 | B2* | 9/2014 | Way | H04B 10/5167 398/135 |
| 8,938,166 | B2 | 1/2015 | Roullot | |
| 8,989,590 | B2* | 3/2015 | Wojtowicz | H04B 10/40 398/135 |
| 8,989,591 | B2* | 3/2015 | Kauffeldt | H04J 14/0275 398/135 |
| 9,037,755 | B2* | 5/2015 | Tang | H04L 12/413 398/135 |
| 9,319,143 | B2 | 4/2016 | El-Ahmadi et al. | |
| 9,496,960 | B2* | 11/2016 | El-Ahmadi | H04L 7/0075 |
| 2003/0053170 | A1* | 3/2003 | Levinson | H04B 10/40 398/139 |
| 2004/0033079 | A1* | 2/2004 | Sheth | H04B 10/801 398/135 |
| 2004/0175177 | A1* | 9/2004 | Lee | H04B 10/2503 398/72 |
| 2005/0084269 | A1* | 4/2005 | Dallesasse | G02B 6/4201 398/135 |
| 2005/0244165 | A1* | 11/2005 | Hofmeister | H04B 10/29 398/155 |
| 2005/0281193 | A1* | 12/2005 | Hofmeister | H04L 1/205 370/217 |
| 2006/0093372 | A1 | 5/2006 | Hahin et al. | |
| 2006/0228115 | A1* | 10/2006 | Binetti | H04J 14/0201 398/83 |
| 2007/0031153 | A1* | 2/2007 | Aronson | H04B 10/40 398/138 |
| 2007/0050658 | A1* | 3/2007 | Kuwata | H04L 7/0008 713/503 |
| 2008/0089693 | A1* | 4/2008 | El-Ahmadi | H04L 1/0057 398/135 |
| 2008/0267633 | A1* | 10/2008 | Weem | H04B 10/40 398/116 |
| 2009/0214221 | A1 | 8/2009 | Li et al. | |
| 2009/0257754 | A1* | 10/2009 | Theodoras, II | H04L 49/30 398/135 |
| 2010/0158530 | A1* | 6/2010 | Soto | H04B 10/40 398/79 |
| 2011/0081145 | A1* | 4/2011 | Burrell | H04L 12/413 398/41 |
| 2011/0255865 | A1* | 10/2011 | Brooks | H04L 1/203 398/27 |
| 2013/0177309 | A1 | 7/2013 | El-Ahmadi et al. | |
| 2013/0215936 | A1* | 8/2013 | Tang | H04L 12/413 375/219 |
| 2013/0343755 | A1 | 12/2013 | Cvijetic et al. | |
| 2014/0308032 | A1* | 10/2014 | Skirmont | H04B 10/0773 398/25 |
| 2015/0055664 | A1* | 2/2015 | Kanonakis | H04L 12/40136 370/535 |
| 2015/0237421 | A1* | 8/2015 | Morgan | H04Q 11/0005 398/45 |
| 2016/0142136 | A1* | 5/2016 | Izumi | H04B 10/07955 398/38 |
| 2016/0173964 | A1 | 6/2016 | Weldon et al. | |
| 2016/0191152 | A1* | 6/2016 | Soto | H04B 10/0775 398/16 |
| 2016/0380698 | A1* | 12/2016 | Elahmadi | H04B 10/40 398/135 |

OTHER PUBLICATIONS

"An open approach for switching, routing, and transport," https://code.facebook.com/, 2016 [retrieved on Nov. 2, 2016] Retrieved from the Internet: <URL: https://code.facebook.com/posts/1977308282496021/an-open-approach-for-switching-routing-and-transport/> (8 pages).
"CFP MSA Hardware Specification," www.cfp-msa.org, 2010 [retrieved on Jul. 20, 2016] <URL: http://www.cfp-msa.org/Documents/CFP-MSA-HW-Spec-rev1-40.pdf> (53 pages).
"INF-8074i Specification for SFP (Small Formfactor Pluggable) Transceiver," ftp://ftp.seagate.com/sff/, 2001, [retrieved on Jul. 20, 2016] <URL: ftp://ftp.seagate.com/sff/INF-8074.PDF> (39 pages).
"Flex Ethernet Implementation Agreement IA # OIF-FLEXE-01.0," www.oiforum.com, 2016 [retrieved on Jul. 19, 2016] <URL: http://www.oiforum.com/wp-content/uploads/OIF-FLEXE-01.0.pdf> (31 pages).
"Path to 400G," www.fujitsu.com, 2013 [retrieved on Jul. 21, 2016] <URL: https://www.fujitsu.com/us/Images/Pathto400G.pdf> (7 pages).
"SFF-8436 Specification for QSFP+ 10 Gbs 4X Pluggable Transceiver," 2013, tp.seagate.com [retrieved on Jul. 20, 2016] <URL: ftp://ftp.seagate.com/pub/sff/SFF-8436.PDF> (89 pages).

* cited by examiner

100

120

400

500

OPTICAL TRANSCEIVER HAVING AN INTERFACE CIRCUIT WITH A ROUTING CAPABILITY

CROSS-REFERENCE TO RELATED APPLICATIONS

This application claims priority from U.S. Provisional Patent Application Ser. No. 62/416,212 filed on 2 Nov. 2016, and entitled "OPTICAL TRANSCEIVER HAVING AN INTERFACE CIRCUIT WITH A ROUTING CAPABILITY," which is incorporated herein by reference in its entirety.

BACKGROUND

Field

The present disclosure relates to optical communication equipment and, more specifically but not exclusively, to optical transceivers.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical transceiver, e.g., a pluggable device, can be used to interface a network device to a fiber-optic cable for telecommunications and data-transport applications. The network device can be a switch, a router, a media converter, or the like, and have one or more standardized electrical-connection slots into which one or more respective pluggable optical transceivers can be inserted. The form factor of the slot and the technical details of the corresponding electrical interface are typically specified in a corresponding multi-source agreement (MSA) that enables interchangeable use of various pluggable optical transceivers with network devices made by different equipment manufacturers. Example multi-source agreements include (1) "CFP MSA Hardware Specification," Revision 1.4, 7 Jun. 2010; (2) "INF-8074i Specification for SFP (Small Formfactor Pluggable) Transceiver," Revision 1.0, 12 May 2001; and (3) "QSFP+10 Gbs 4× PLUGGABLE TRANSCEIVER," Revision 4.8, 31 Oct. 2013, all of which are incorporated herein by reference in their entirety.

SUMMARY OF SOME SPECIFIC EMBODIMENTS

Disclosed herein are various embodiments of a transceiver module having (i) at least two optical transceivers, each connectable to a different respective optical line, and (ii) a pluggable electrical connector that can be mated with a matching electrical connector in a connection slot of the host network device. The transceiver module also has an electrical interface circuit that can transfer data between the optical transceivers and the host network device in a manner that provides a route for transferring data between two optical transceivers without crossing the pluggable and matching electrical connectors. This architecture advantageously enables the optical-line rates to not be limited or constrained by the electrical data rate of data transfer through the electrical connectors. In some embodiments, the transceiver module is (re)configurable in a manner that can change the optical-line rates of the optical transceivers and/or the electrical data rate. The latter feature enables the transceiver module to be compatible with both older (e.g., legacy, 100G) network devices and newer (e.g., 500G) network devices.

According to one example embodiment, provided is an apparatus comprising a transceiver module that comprises: a pluggable electrical connector; a first optical transceiver connectable to a first optical fiber or fiber-optic cable; a second optical transceiver connectable to a second optical fiber or fiber-optic cable; and an electrical interface circuit electrically coupled between the first optical transceiver, the second optical transceiver, and the pluggable electrical connector, the electrical interface circuit being capable of: transferring data between the first optical transceiver and the pluggable electrical connector; transferring data between the second optical transceiver and the pluggable electrical connector; and transferring data between the first optical transceiver and the second optical transceiver without causing the data that are being transferred between the first optical transceiver and the second optical transceiver to go through the pluggable electrical connector.

According to another example embodiment, provided is an apparatus comprising: an electrical switch fabric; a first optical transceiver connectable to a first optical fiber or fiber-optic cable; a second optical transceiver connectable to a second optical fiber or fiber-optic cable; and an electrical interface circuit electrically coupled between the first optical transceiver, the second optical transceiver, and the electrical switch fabric, the electrical interface circuit being capable of: transferring data between the first optical transceiver and the electrical switch fabric; transferring data between the second optical transceiver and the electrical switch fabric; and transferring data between the first optical transceiver and the second optical transceiver without causing the data that are being transferred between the first optical transceiver and the second optical transceiver to go through the electrical switch fabric.

According to yet another example embodiment, provided is an apparatus comprising: a collection of one or more client network ports; an optical receiver configured to receive data from a first optical fiber; an optical transmitter configured to transmit data to a second optical fiber; and an electrical interface circuit electrically connected to communicatively couple the optical receiver, the optical transmitter, and the collection of one or more client network ports; and wherein the electrical interface circuit is configured to electrically route a part of the data received at the optical receiver from the first optical fiber on a single optical wavelength channel to the collection of one or more client network ports and to electrically route another part of the data received from the first optical fiber at the optical receiver on the same single optical wavelength channel to the optical transmitter.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

As optical-line rates of pluggable optical transceivers increase, the electrical interface to the corresponding connection slot of the host network device is becoming more difficult to implement. For example, a relatively recent generation of pluggable optical transceivers can support the optical-line rates of up to 400 Gb/s. Accommodation of an optical-line rate this high can disadvantageously increase the cost of the interface design, increase the production costs of the corresponding electrical interface circuit(s), and limit the distance between the interconnected slots of the host network device and thereby the practically usable size and capacity of the corresponding transceiver rack.

At least some of the above-indicated problems in the state of the art are addressed by various embodiments disclosed herein. For example, some of the disclosed embodiments are directed at reducing the bit rate at the electrical interface between an optical transceiver and the host network device by providing a bypass data path within the corresponding pluggable transceiver module having two or more optical transceivers residing therein. The bypass data path can advantageously be used to transfer some of the data directly between the optical transceivers of the pluggable transceiver module, without directing those data out for external routing by the host network device. The bypass data path enables the electrical interface between the pluggable transceiver module and the host network device to operate at a bit rate that is lower than the optical-line rate, which relaxes some of the interface specifications and helps to reduce the corresponding electrical-circuit complexity and/or cost. In some embodiments, the bit rate(s) of data transfer through the electrical interface can be changeable, e.g., within a rate interval bounded at the upper end thereof by the optical-line rate. This particular feature of the disclosed pluggable transceiver module can be used, e.g., to enable operability of the same model of the pluggable transceiver module with different network devices that support different respective maximum bit rates, including those whose maximum supported bit rate is smaller than the operative optical-line rate.

Figure 1:
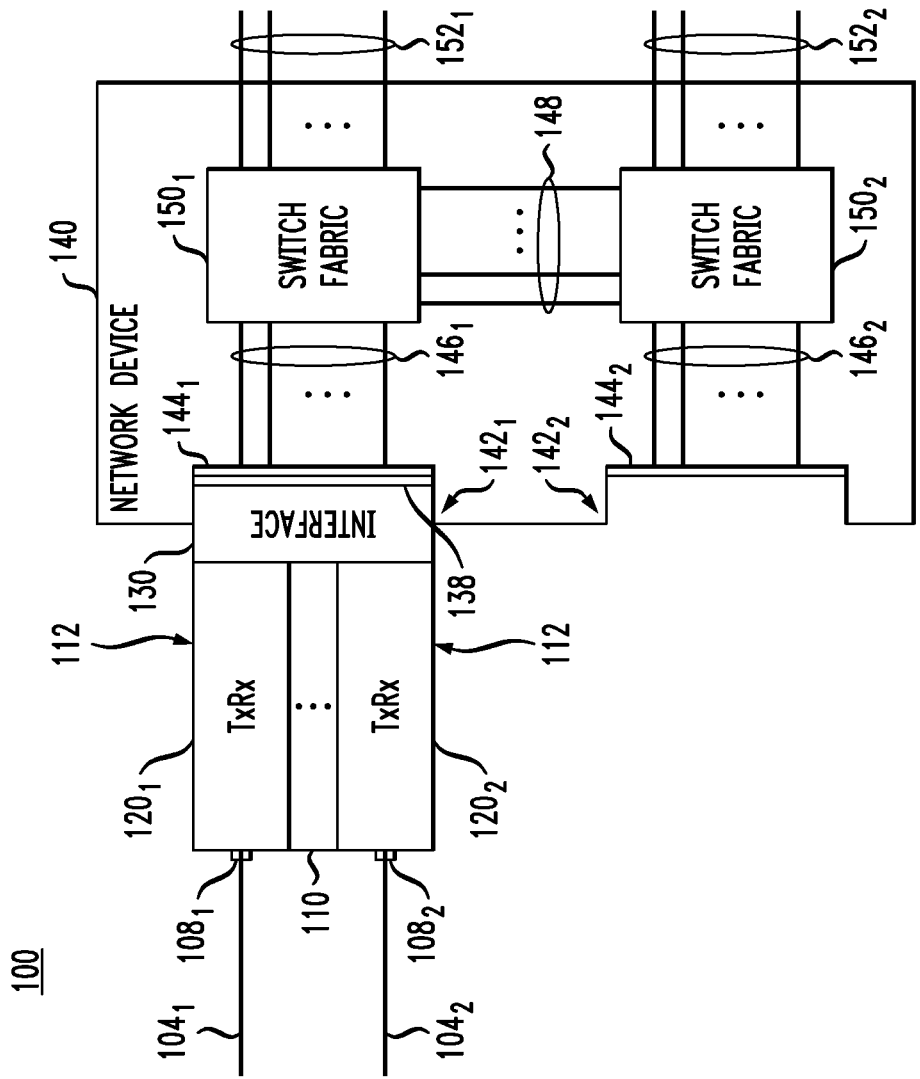
FIG. 1 shows a block diagram of a network node according to an embodiment.

FIG. 1 shows a block diagram of a network node 100 according to an embodiment. Node 100 comprises a network device 140 having one or more electrical connection slots 142, each configured to accept a compatible pluggable module, such as a pluggable transceiver module 110. In an example embodiment, network device 140 can be a router, a network switch, etc. For illustration purposes and without any implied limitation, network device 140 is shown in FIG. 1 as having two connection slots 142, which are labeled $142_1$ and $142_2$, respectively. Connection slot $142_1$ has transceiver module 110 plugged therein. Connection slot $142_2$ is illustratively shown as being vacant. A person of ordinary skill in the art will understand that, in an alternative embodiment, network device 140 can have only one connection slot 142 or more than two connection slots 142.

In an example embodiment, each of connection slots 142 has a respective first (e.g., female) portion 144 of a multi-pin connector that can be mated with a second (e.g., male) portion 138 of the multi-pin connector attached to the corresponding pluggable module. For example, connection slot $142_1$ has a first connector portion $144_1$ that is mated with the second connector portion 138 fixedly attached to transceiver module 110. If transceiver module 110 is removed from connection slot $142_1$, then connector portions 138 and $144_1$ disengage in a reversible manner, with the resulting emptied connection slot becoming similar to the vacant connection slot $142_2$.

In an example embodiment, an electrical connector 138/144 has a set of power-supply pins, a set of pins allocated to control signals, and a set of pins allocated to data signals. The pin layout, configuration, and allocation typically comply with the corresponding multi-source agreement, such as one of the above-cited CFP, SFP, and QSFP agreements. In alternative embodiments, custom or proprietary pin layouts, configurations, and/or allocations can also be used.

A plurality of electrical data lanes $146_1$ connect the data pins of electrical connector $138/144_1$ to a switch fabric $150_1$. A plurality of electrical data lanes $146_2$ similarly connect connector portion $144_2$ of the vacant connection slot $142_2$ to a switch fabric $150_2$. A plurality of electrical data lanes 148 connect switch fabrics $150_1$ and $150_2$ to one another. A plurality of electrical data lanes $152_1$ connect switch fabric $150_1$ to external circuits, e.g., to the corresponding access or local-area network (not explicitly shown in FIG. 1). A plurality of electrical data lanes $152_2$ similarly connect switch fabric $150_2$ to external circuits.

In operation, switch fabric $150_1$ can electrically connect any of electrical data lanes $146_1$ to any of electrical data lanes 148 and $152_1$. Switch fabric $150_2$ can similarly electrically connect any of electrical data lanes $146_2$ to any of electrical data lanes 148 and $152_2$. Switch fabrics $150_1$ and $150_2$ can be dynamically reconfigured to change the electrical connections therein to route the various data signals carried by electrical data lanes 146, 148, and 152 to their respective intended destinations.

Pluggable transceiver module 110 includes two or more optical transceivers (TxRx's) 120 and an interface circuit 130. For illustration purposes and without any implied limitation, pluggable transceiver module 110 is shown in FIG. 1 as having two optical transceivers 120, which are labeled $120_1$ and $120_2$, respectively. An example embodiment of optical transceiver 120 is described in more detail below in reference to FIG. 2. Example embodiments of interface circuit 130 are described in more detail below in reference to FIGS. 3A-3B. Additional optical transceivers that can be used to implement optical transceivers 120 are disclosed, e.g., in U.S. Pat. Nos. 8,406,630, 8,571,416, 8,938,166, and 9,319,143, all of which are incorporated herein by reference in their entirety.

In an example embodiment, pluggable transceiver module 110 comprises a support frame or housing 112 to which connector portion 138, optical transceivers $120_1$ and $120_2$, and interface circuit 130 are fixedly attached in a manner that enables the pluggable transceiver module to be inserted, as a unit, into a corresponding connection slot (e.g., connection slot 142) and to be extracted, as a unit, from the corresponding connection slot. The support frame or housing 112 has a form factor that may, e.g., comply with a corresponding multi-source agreement, such as one of the above-cited CFP, SFP, and QSFP agreements.

Pluggable transceiver module 110 may have a plurality of fiber connectors 108, but only two are explicitly shown in FIG. 1 for illustration purposes. The shown two fiber connectors are labeled $108_1$ and $108_2$, respectively. Fiber connector $108_1$ is used to end-connect an optical fiber or fiber-optic cable $104_1$ to optical transceiver $120_1$. Fiber connector $108_2$ is similarly used to end-connect an optical fiber or fiber-optic cable $104_2$ to optical transceiver $120_2$. In an alternative embodiment, pluggable transceiver module 110 can have more than two fiber connectors 108.

Figure 5:
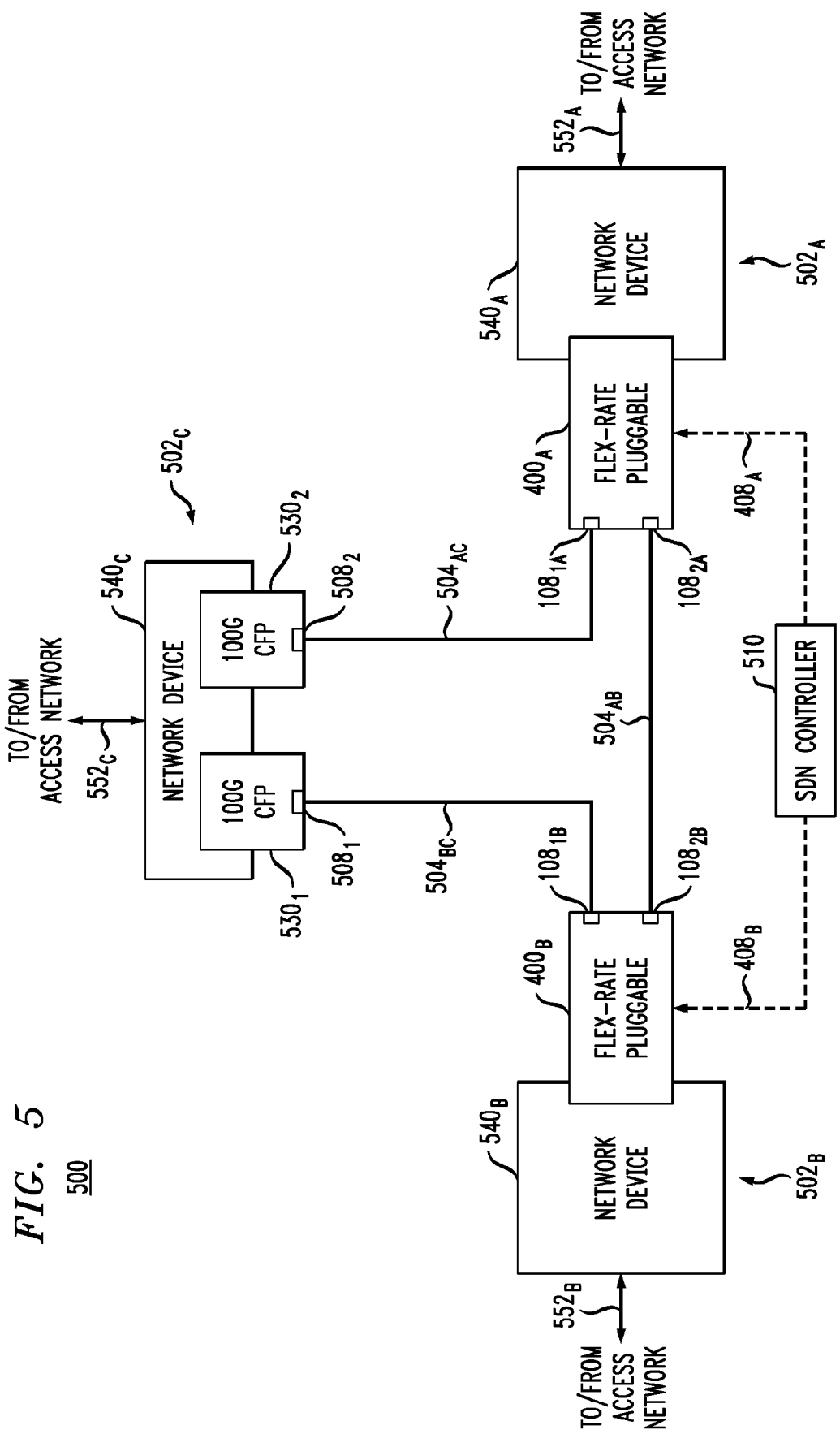
FIG. 5 shows a block diagram of an example optical network in which the pluggable transceiver module of FIG. 4 can be used according to an embodiment.

In an example embodiment, a fiber connector 108 accepts an optical fiber or fiber-optic cable 104 that is designed and configured to support a duplex connection with a remote transceiver (not explicitly shown in FIG. 1; see, e.g., FIG. 5). In some embodiments, fiber connector 108 can be designed to support a configuration in which the incoming and outgoing optical signals travel through the same strand of optical fiber. In some other embodiments, fiber connector 108 can be designed for a configuration in which the incoming and outgoing optical signals travel through different respective strands of optical fiber.

In various embodiments, optical transceiver 120 can be designed to use one or more forms of optical multiplexing, e.g., as known in the art. The one or more forms of optical multiplexing can be selected from the following example set: (i) time-division multiplexing; (ii) polarization-division multiplexing; (iii) wavelength-division multiplexing; and (iv) space-division multiplexing. In some embodiments, optical transceiver 120 can be designed to be compatible with a super-channel transmission format and/or an optical OFDM transmission format.

In operation, pluggable transceiver module 110 performs appropriate signal processing, conversion, and routing to enable transmission of appropriate data signals between (i) optical fiber or fiber-optic cable (hereafter referred to as optical line) $104_1$, (ii) optical line $104_2$, and (iii) electrical data lanes $146_1$. For example, some data signals can be transmitted (with appropriate conversion) between optical line $104_1$ and a subset of electrical data lanes $146_1$. Some data signals can similarly be transmitted (with appropriate conversion) between optical line $104_2$ and another subset of electrical data lanes $146_1$. Some data signals can be transmitted (with appropriate conversion) between optical line $104_1$ and optical line $104_2$. In the latter case, the data signals are directed by way of a bypass data path (not explicitly shown in FIG. 1; see, e.g., FIGS. 3A-3B) within interface circuit 130, which causes these data signals not to cross electrical connector $138/144_1$ and not to enter network device 140.

In some embodiments of network node 100, the relationship between certain bit rates used therein can mathematically be described using the following inequalities:

$$R_1+R_2 \geq R_3 \quad (1)$$

$$|R_1-R_2| \leq R_3 \quad (2)$$

where $R_1$ and $R_2$ are the optical-line rates corresponding to optical lines $104_1$ and $104_2$, respectively; and $R_3$ is the data rate corresponding to traffic directed between pluggable transceiver module 110 and the plurality of electrical data lanes $146_1$ of network device 140 by way of electrical connector $138/144_1$. In some embodiments, $R_1=R_2$. In some other embodiments, $R_1 \neq R_2$. In some embodiments, each of the rates $R_1$, $R_2$, and $R_3$ represents a unidirectional bit rate. For embodiments in which a duplex connection is supported, network node 100 can support each of the rates $R_1$, $R_2$, and $R_3$ in each direction. In some embodiments, $R_1+R_2$ is about equal to or near to 400 Gb/s.

In some other embodiments of network node 100, the relationship between the rates $R_1$, $R_2$, and $R_3$ can mathematically be described using the following inequality:

$$R_1+R_2 \leq R_3 \quad (3)$$

In yet some other embodiments of network node 100, the relationship between the rates $R_1$, $R_2$, and $R_3$ can mathematically be described using the following inequality:

$$|R_1-R_2| \geq R_3 \quad (4)$$

In general, various embodiments can provide flexibility in selecting the various rates in the sense that the client-side rate(s) and the optical-line rates do not necessarily need to balance each other out. For example, in an embodiment in which transceiver module 110 has only two transceivers, the relationship between the rates $R_1$, $R_2$, and $R_3$ can mathematically be described using the following inequalities:

$$R_1+R_2 \neq R_3 \quad (5)$$

$$|R_1-R_2| \neq R_3 \quad (6)$$

In some embodiments, each or some of the rates $R_1$, $R_2$, and $R_3$ can be changeable. For example, the optical-line rates $R_1$ and $R_2$ can be changed by changing the size of the operative constellation used in the generation and decoding of the modulated optical signals and/or the number of populated carrier wavelengths. Example constellations used for this purpose can include two or more constellations selected from the following (nonexclusive) constellation set: (i) a Quadrature-Phase-Shift-Keying (QPSK) constellation; (ii) a 16-Quadrature-Amplitude-Modulation (16-QAM) constellation; (iii) a 64-QAM constellation; and (iv) a 256-QAM constellation. The electrical data rate $R_3$ can be changed, e.g., by changing the electrical symbol rate and/or the electrical modulation format. Example approximate symbol rates used for this purpose can includes two or more of the following rates: k×10 Gb/s, 1×40 Gb/s, and m×25 Gb/s, where k, l, and m are positive integers. Example electrical modulation formats used for this purpose can include the non-return-to-zero (NRZ) format and the 4-level pulse-amplitude-modulation (PAM-4) format. In some embodiments, pluggable transceiver module 110 can be designed to support changeable rates $R_1$, $R_2$, and $R_3$ selectable in accordance with the Flex Ethernet Implementation Agreement IA # OIF-FLEXE-01.0, dated March 2016, which is incorporated herein by reference in its entirety. In some embodiments, specifically the interface circuit 130 within pluggable transceiver module 110 can be designed to implement and support the Flex Ethernet Implementation Agreement.

Figure 2:
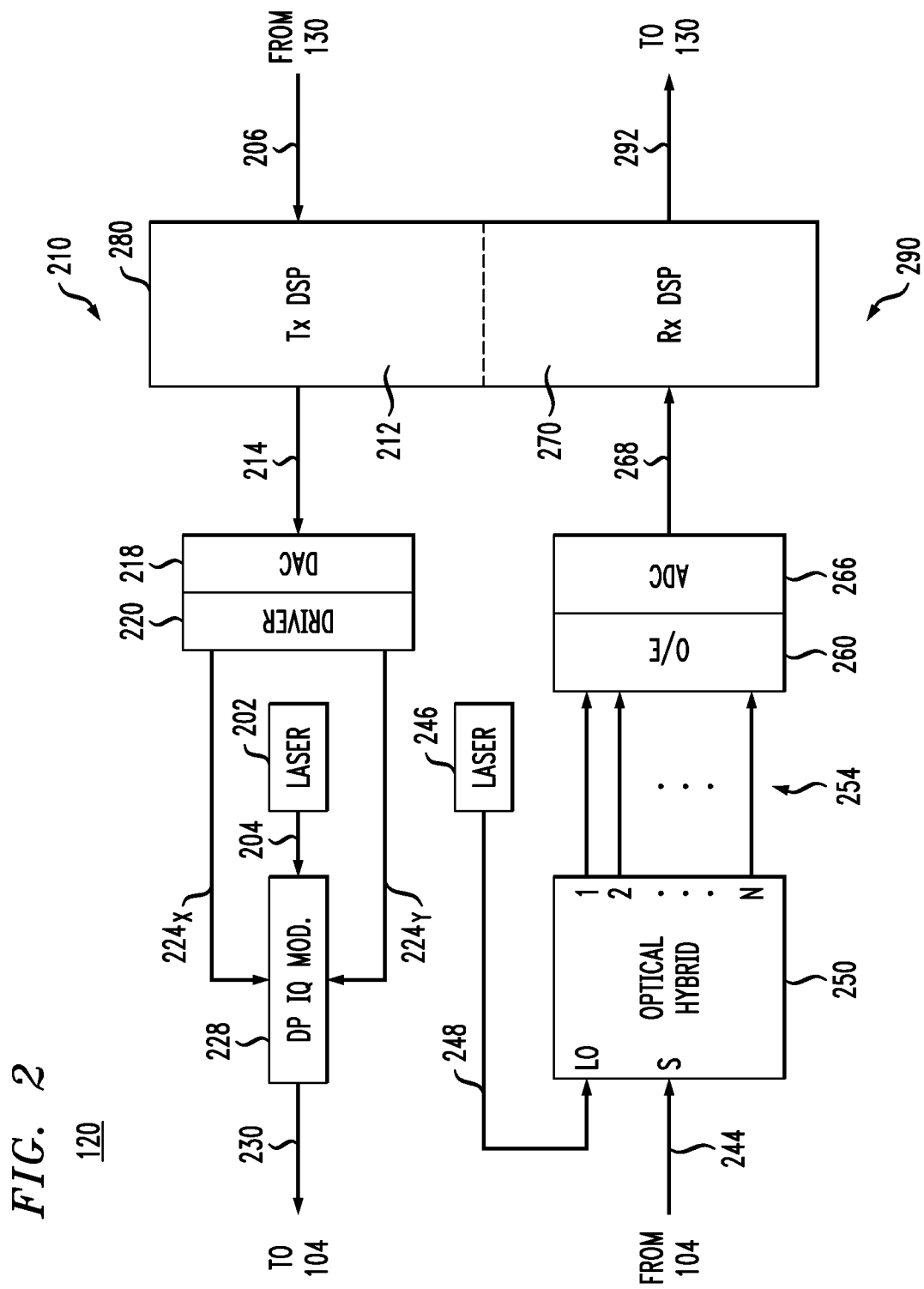
FIG. 2 shows a block diagram of an optical transceiver that can be used in the network node of FIG. 1 according to an embodiment.

FIG. 2 shows a block diagram of an optical transceiver 120 that can be used in pluggable transceiver module 110 (FIG. 1) according to an embodiment. The connections to the corresponding optical line 104 and interface circuit 130 are also indicated in FIG. 2 to more-clearly show the relationship between the block diagrams of FIGS. 1-3.

As indicated in FIG. 2, optical transceiver 120 includes an optical transmitter (Tx) 210 and an optical receiver (Rx) 290, both of which are connected to optical line 104. Optical transmitter 210 operates to generate a modulated optical signal 230 that carries the data received from interface circuit 130 by way of a digital electrical signal 206. Optical receiver 290 operates to generate an electrical digital signal 292 that carries the data encoded in a modulated optical signal 244 applied to the optical receiver by optical line 104.

In operation, optical transmitter 210 applies the received digital signal 206 to a transmitter (Tx) portion 212 of a digital signal processor (DSP) 280. Tx DSP 212 processes digital signal 206 to generate one or more electrical digital signals 214. In each signaling interval, signal 214 carries digital values that represent the in-phase (I) and quadrature (Q) components of the constellation symbols intended for transmission over optical line 104. A digital-to-analog converter (DAC) 218 and a driver circuit 220 transform digital signal(s) 214 into electrical drive signals $224_X$ and $224_Y$ that are then used, in a conventional manner, to drive a dual-polarization (DP) optical IQ modulator 228. In response to electrical drive signals $224_X$ and $224_Y$, modulator 228 modulates an optical carrier wave 204 received from a laser 202, thereby generating modulated optical signal 230, which is then coupled into optical line 104 in a conventional manner.

Optical receiver 290 comprises a polarization-diverse 90-degree optical hybrid 250, an optical-to-electrical (O/E) converter 260, and an analog-to-digital converter (ADC) 266. Optical hybrid 250 has (i) two input ports labeled LO and S and (ii) a plurality of output ports labeled 1 through N. Input port S receives optical signal 244 from optical line 104. Input port LO receives an optical local-oscillator (OLO) signal 248 generated by a laser 246. In an example embodiment, N=8. In some embodiments, laser 246 can be removed, in which case OLO signal 248 can be generated by splitting off a portion of optical carrier wave 204 generated by laser 202 of optical transmitter 210.

Optical hybrid 250 operates to optically mix modulated optical signal 244 and OLO signal 248 to generate N corresponding optical interference signals 254. O/E converter 260 then converts optical interference signals 254 into the corresponding electrical signals (not explicitly shown in FIG. 2) that are indicative of the complex values corresponding to the two orthogonal-polarization components of modulated optical signal 244. ADC 266 converts these electrical signals into digital form and applies a resulting electrical digital signal 268 to a receiver (Rx) portion 270 of DSP 280. Rx DSP 270 then appropriately processes electrical digital signal 268, e.g., as known in the art, to generate electrical digital signal 292. Signal 292 carries the data encoded in modulated optical signal 244 and is directed to interface circuit 130.

In alternative embodiments, other types of optical transmitters and receivers can similarly be used to implement optical transceiver 120. For example, in some embodiments, optical transmitters and receivers that handle high-density modulation based on non-coherent transmission can similarly be used to implement optical transceiver 120.

Figure 3A:
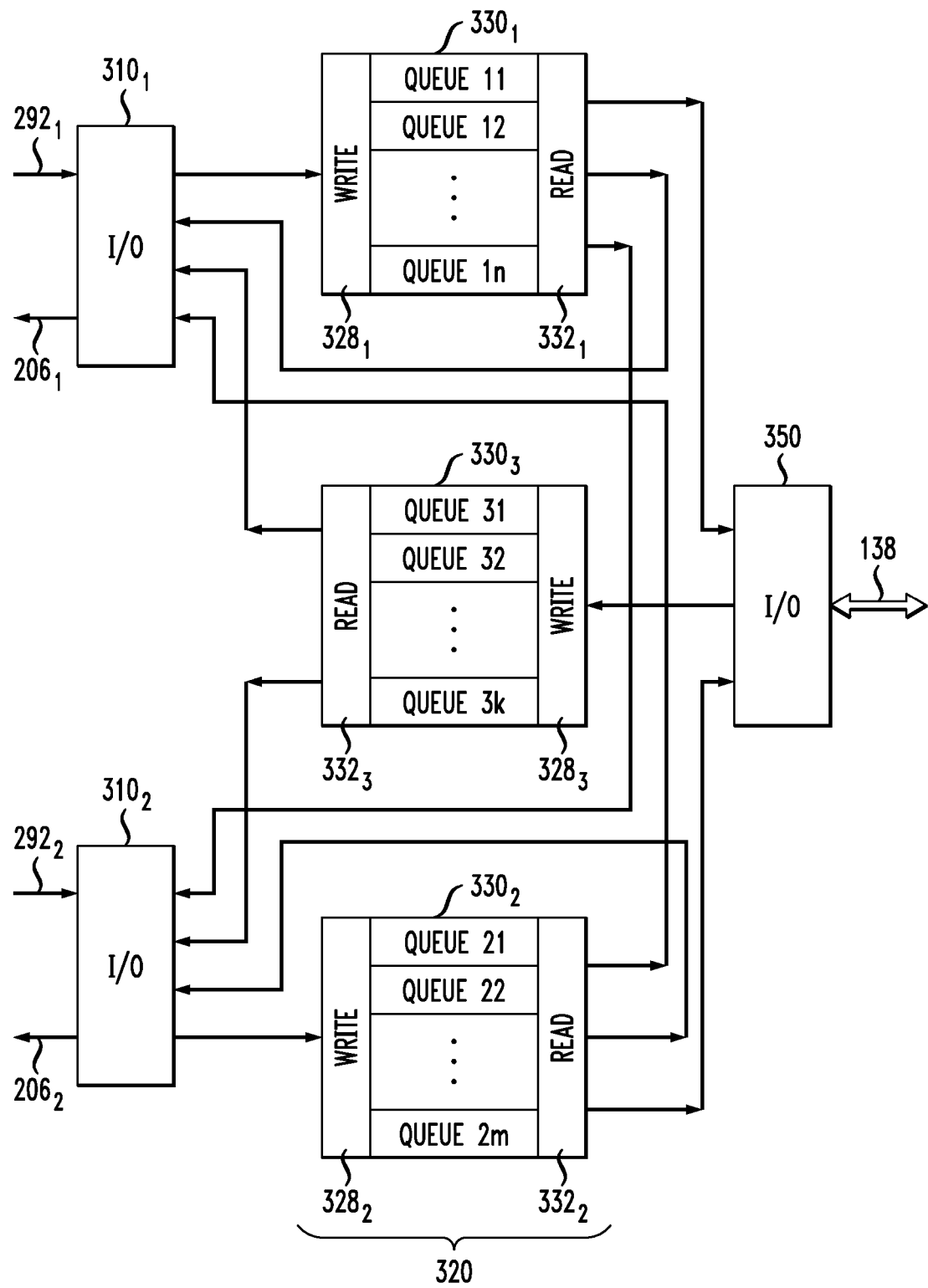
FIGS. 3A-3B show block diagrams of an interface circuit that can be used in the network node of FIG. 1 according to example embodiments.

FIG. 3A shows a block diagram of interface circuit 130 according to an embodiment. For illustration purposes and without any implied limitation, interface circuit 130 is described in reference to an embodiment corresponding to pluggable transceiver module 110 (FIG. 1) that has only two optical transceivers 120 (FIG. 2). From the provided description, a person of ordinary skill in the art will be able to make and use an alternative embodiment of interface circuit 130 that is compatible with a pluggable transceiver module 110 having more than two optical transceivers 120.

Interface circuit 130 comprises electrical input/output (I/O) interfaces $310_1$, $310_2$, and 350. I/O interface $310_1$ is connected to optical transceiver $120_1$ (also see FIG. 1). As such, I/O interface $310_1$ operates to receive the data signal $292_1$ and output the data signal $206_1$ from/to optical transceiver $120_1$ (also see FIG. 2). I/O interface $310_2$ is similarly connected to optical transceiver $120_2$ (FIG. 1) and, as such, operates to receive the data signal $292_2$ and output the data signal $206_2$ from/to optical transceiver $120_2$. I/O interface 350 is connected to electrical connector 138 (also see FIG. 1).

Interface circuit 130 further comprises a data buffer 320 connected to I/O interfaces $310_1$, $310_2$, and 350 as indicated in FIG. 3A. In an example embodiment, data buffer 320 has three sets of queues, which are labeled $330_1$, $330_2$, and $330_3$, respectively. The queue set $330_1$ has queues 11, 12, . . . , and 1n, where n is a positive integer. The queue set $330_2$ has queues 21, 22, . . . , and 2m, where m is a positive integer. The queue set $330_3$ has queues 31, 32, . . . , and 3k, where k is a positive integer. The numbers k, m, and n depend on the number of addresses associated with optical transceivers $120_1$ and $120_2$ and with the clients connected to network device 140 by way of data lanes 152. In an example embodiment, each of the queues 11, 12, . . . , 1n, 21, 22, . . . , 2m, 31, 32, . . . , 3k can be configured to buffer data intended for transmission to a different respective address or a different respective set of destination addresses. In various embodiments, the numbers k, m, and n can be all different, all the same, or selected from an integer-number set consisting of two different numbers.

The queue set $330_1$ is connected to receive data from I/O interface $310_1$ by way of a write circuit $328_1$, and further connected to output data to I/O interfaces $310_1$, $310_2$, and 350 by way of a read circuit $332_1$. The queue set $330_2$ is similarly connected to receive data from I/O interface $310_2$ by way of a write circuit $328_2$, and further connected to output data to I/O interfaces $310_1$, $310_2$, and 350 by way of a read circuit $332_2$. The queue set $330_3$ is connected to receive data from I/O interface 350 by way of a write circuit $328_3$, and further connected to output data to I/O interfaces $310_1$ and $310_2$ by way of a read circuit $332_3$.

In an example embodiment, a write circuit 328 operates to queue each received data frame in the corresponding one of the queues connected thereto in accordance with the destination address contained in the frame header. A read circuit 332 then de-queues the data frames from the queues, also in accordance with the destination address. Read circuits $332_1$-$332_3$ can be configured to access the different queues, e.g., in accordance with a predetermined schedule (such as a round-robin schedule), data priority levels, and/or quality-of-service requirements.

For the embodiment shown in FIG. 3A, the destination addresses can be sorted into first, second, and third distinct groups corresponding to optical transceivers $120_1$ and $120_2$ and the clients connected to network device 140, respectively. In operation, a read circuit 332 de-queues a data frame by directing that data frame to a corresponding one of I/O interfaces $310_1$, $310_2$, and 350 based on the frame destination address. For example, if the frame destination address corresponds to optical transceiver $120_1$, then the read circuit 332 of the corresponding queue set 330 de-queues that data frame by directing it to I/O interface $310_1$. If the frame destination address corresponds to optical transceiver $120_2$, then the read circuit 332 of the corresponding queue set 330 de-queues that data frame by directing it to I/O interface $310_2$. If the frame destination address corresponds to a client connected to network device 140, then the read circuit 332 of the corresponding queue set 330 de-queues that data frame by directing it to I/O interface 350.

In an example embodiment, interface circuit 130 of FIG. 3A is capable of performing one or more of the following data-frame operations:

(i) drop a data frame from the optical-line side to the client side thereof;

(ii) add a data frame from the client side to the optical-line side thereof;

(iii) drop-and-continue a data frame;

(iv) multiplex data frames;

(v) de-multiplex data frames;

(vi) selectively discard data frames in either direction; and (vii) broadcast a data frame or a set of data frames to multiple I/O ports.

Several nonexclusive examples provided herein below further illustrate these data-frame operations. Each of the provided examples illustrates how interface circuit 130 of FIG. 3A can handle four data frames, which are referred to as frames A, B, C, and D. Based on these examples, a person of ordinary skill in the art will be able to configure interface circuit 130 or a functional equivalent thereof to implement various other data-frame operations, not necessarily involving four data frames.

According to a first example, interface circuit 130 receives frames A, B, C, and D through I/O interface $310_2$ with the frame destination addresses and/or under conditions that require frame B to be dropped from the optical-line side to the client side of node 100. Consequently, write circuit $328_2$ of interface circuit 130 operates to: (i) queue frames A, C, and D in queue 21 and (ii) queue frame B in queue 22. Read circuit $332_2$ of interface circuit 130 then operates to (i) de-queue frames A, C, and D from queue 21 by directing each of these frames to I/O interface $310_1$ and (ii) de-queue frame B from queue 22 by directing that frame to I/O interface 350. As a result, frames A, C, and D are applied, by way of signal $206_1$, to optical transceiver $120_1$ for optical transmission therefrom through optical line $104_1$ (also see FIGS. 1-2). In contrast, frame B is applied, by way of connector 138/144$_1$, to a corresponding one of data lanes 146$_1$ of network device 140 and, as such, is dropped from the optical side to the client side. To support this example data-frame operation, pluggable transceiver module 110 may use the following example rates $R_1$, $R_2$, and $R_3$: $R_1$=300 Gb/s; $R_2$=400 Gb/s; and $R_3$=100 Gb/s (also see Eqs. (1)-(2)).

According to a second example, interface circuit 130 receives frames A, B, C, and D through I/O interface $310_2$ with the frame destination addresses and/or under conditions that require frame B to both: (i) be dropped from the optical-line side to the client side of node 100 and (ii) to continue on at the optical side. In some pertinent literature, this type of a data-frame operation is referred to as a "drop-and-continue" operation. Consequently, write circuit $328_2$ of interface circuit 130 operates to: (i) queue frames A, B, C, and D in queue 21 and (ii) queue a copy of frame B in queue 22. Read circuit $332_2$ of interface circuit 130 then operates to (i) de-queue frames A, B, C, and D from queue 21 by directing each of these frames to I/O interface $310_1$ and (ii) de-queue the copy of frame B from queue 22 by directing that frame copy to I/O interface 350. As a result, frames A, B, C, and D are applied, by way of signal $206_1$, to optical transceiver $120_1$ for optical transmission therefrom through optical line $104_1$ (also see FIGS. 1-2). In addition, a copy of frame B is applied, by way of connector 138/144$_1$, to a corresponding one of data lanes 146$_1$ of network device 140. To support this example data-frame operation, pluggable transceiver module 110 may use the following example rates $R_1$, $R_2$, and $R_3$: $R_1$=$R_2$=400 Gb/s and $R_3$=100 Gb/s (also see Eqs. (1)-(2)).

According to a third example, interface circuit 130 receives (i) frames A and C through I/O interface $310_2$ and (ii) frames B and D through I/O interface $310_1$. The frame destination addresses and/or other conditions require all of the frames A, B, C, and D to be dropped from the optical-line side to the client side of node 100. Consequently, write circuit $328_2$ of interface circuit 130 operates to queue frames A and C in queue 21. Write circuit $328_1$ similarly operates to queue frames B and D in queue 11. Read circuits $332_1$ and $332_2$ then operate to de-queue the frames queued in queues 11 and 21 in a round-robin manner by sequentially directing those frames to I/O interface 350. As a result, frames A, B, C, and D are applied, in this order, to the corresponding data lanes 146$_1$ of network device 140, which multiplexes the frames received by two different optical transceivers 120 into an outgoing frame stream that flows through connector 138/144$_1$ of pluggable transceiver module 110. To support this example data-frame operation, pluggable transceiver module 110 may use the following example rates $R_1$, $R_2$, and $R_3$: $R_1$=$R_2$=200 Gb/s and $R_3$=400 Gb/s (also see Eqs. (1)-(2)).

According to a fourth example, interface circuit 130 receives (i) frames A, C, and D through I/O interface $310_2$ and (ii) frame B through I/O interface 350. The frame destination addresses and/or other conditions require all of the frames A, B, C, and D to be transmitted using optical transceiver $120_1$. Consequently, write circuit $328_2$ of interface circuit 130 operates to queue frames A, C, and D in queue 21. Write circuit $328_3$ operates to queue frame B in queue 31. Read circuits $332_2$ and $332_3$ then operate to de-queue the frames queued in queues 21 and 31 in a round-robin manner by sequentially directing those frames to I/O interface $310_1$. As a result, frames A, B, C, and D are applied, in this order, by way of signal $206_1$, to optical transceiver $120_1$ for optical transmission therefrom through optical line $104_1$. This data-frame operation therefore adds frame B to the optical transmission. To support this example data-frame operation, pluggable transceiver module 110 may use the following example rates $R_1$, $R_2$, and $R_3$: $R_1$=400 Gb/s, $R_2$=300 Gb/s, and $R_3$=100 Gb/s (also see Eqs. (1)-(2)).

According to a fifth example, interface circuit 130 receives frames A, B, C, and D through I/O interface 350. The frame destination addresses and/or other conditions require (i) frames B and D to be transmitted using optical transceiver $120_1$ and (ii) frames A and C to be transmitted using optical transceiver $120_2$. Consequently, write circuit $328_3$ of interface circuit 130 operates to (i) queue frames B and D in queue 31 and (ii) queue frames A and C in queue 32. Read circuit $332_3$ then operates to (i) de-queue frames B and D from queue 31 by directing those frames to I/O interface $310_1$ and (ii) de-queue frames A and C from queue 32 by directing those frames to I/O interface $310_2$. As a result, frames B and D are applied, by way of signal $206_1$, to optical transceiver $120_1$ for optical transmission therefrom through optical line $104_1$. Frames A and C are similarly applied, by way of signal $206_2$, to optical transceiver $120_2$ for optical transmission therefrom through optical line $104_2$. This data-frame operation therefore de-multiplexes the frame stream ABCD into two separate frame streams, AC and BD, in the process of transferring the frames from the client side to the optical side of pluggable transceiver module 110. To support this example data-frame operation, pluggable transceiver module 110 may use the following example rates $R_1$, $R_2$, and $R_3$: $R_1$=$R_2$=200 Gb/s and $R_3$=400 Gb/s (also see Eqs. (1)-(2)).

According to a sixth example, interface circuit 130 receives (i) frames A and C through I/O interface $310_2$ and (ii) frames B and D through I/O interface $310_1$. The frame destination addresses and/or other conditions require (i) frames A and D to be dropped from the optical-line side to the client side of node 100 and (ii) frames B and C to be discarded. Consequently, write circuit $328_2$ of interface circuit 130 operates to (i) queue frame A in queue 21 and (ii) queue frame C in queue 22. Write circuit $328_1$ similarly operates to (i) queue frame B in queue 11 and (ii) queue frame D in queue 12. Read circuits $332_1$ and $332_2$ then operate to de-queue frames A and D from queues 21 and 12, respectively, by sequentially directing those frames to I/O interface 350. Read circuits $332_1$ and $332_2$ further operate to de-queue frames B and C from queues 11 and 22, respectively, without directing those frames anywhere. As a result, frames A and D are applied, in this order, to the corresponding data lanes $146_1$ of network device 140, which multiplexes the frames received by two different optical transceivers 120 into an outgoing frame stream that flows through connector $138/144_1$ of pluggable transceiver module 110. In addition, frames B and C are discarded. To support this example data-frame operation, pluggable transceiver module 110 may use the following example rates $R_1$, $R_2$, and $R_3$: $R_1=R_2=R_3=200$ Gb/s (also see Eqs. (1)-(2)).

According to a seventh example, interface circuit 130 receives frames A, B, C, and D through I/O interface 350. The frame destination addresses and/or other conditions require (i) frame D to be transmitted using optical transceiver $120_1$, (ii) frame A to be transmitted using optical transceiver $120_2$, and (iii) frames B and C to be discarded. Consequently, write circuit $328_3$ of interface circuit 130 operates to (i) queue frame D in queue 31, (ii) queue frame A in queue 32, and (iii) queue frames B and C in queue 3$k$. Read circuit $332_3$ then operates to (i) de-queue frame D from queue 31 by directing that frame to I/O interface $310_1$, (ii) de-queue frame A from queue 32 by directing that frames to I/O interface $310_2$, and (iii) de-queue frames B and C from queue 3$k$ without directing those frames anywhere. As a result, frame D is applied, by way of signal $206_1$, to optical transceiver $120_1$ for optical transmission therefrom through optical line $104_1$. Frame A is similarly applied, by way of signal $206_2$, to optical transceiver $120_2$ for optical transmission therefrom through optical line $104_2$. In addition, frames B and C are discarded. This data-frame operation therefore de-multiplexes the frame stream ABCD into two frame streams while also performing a selective frame discard. To support this example data-frame operation, pluggable transceiver module 110 may use the following example rates $R_1$, $R_2$, and $R_3$: $R_1=R_2=100$ Gb/s and $R_3=400$ Gb/s (also see Eqs. (3) and (5)).

Figure 3B:
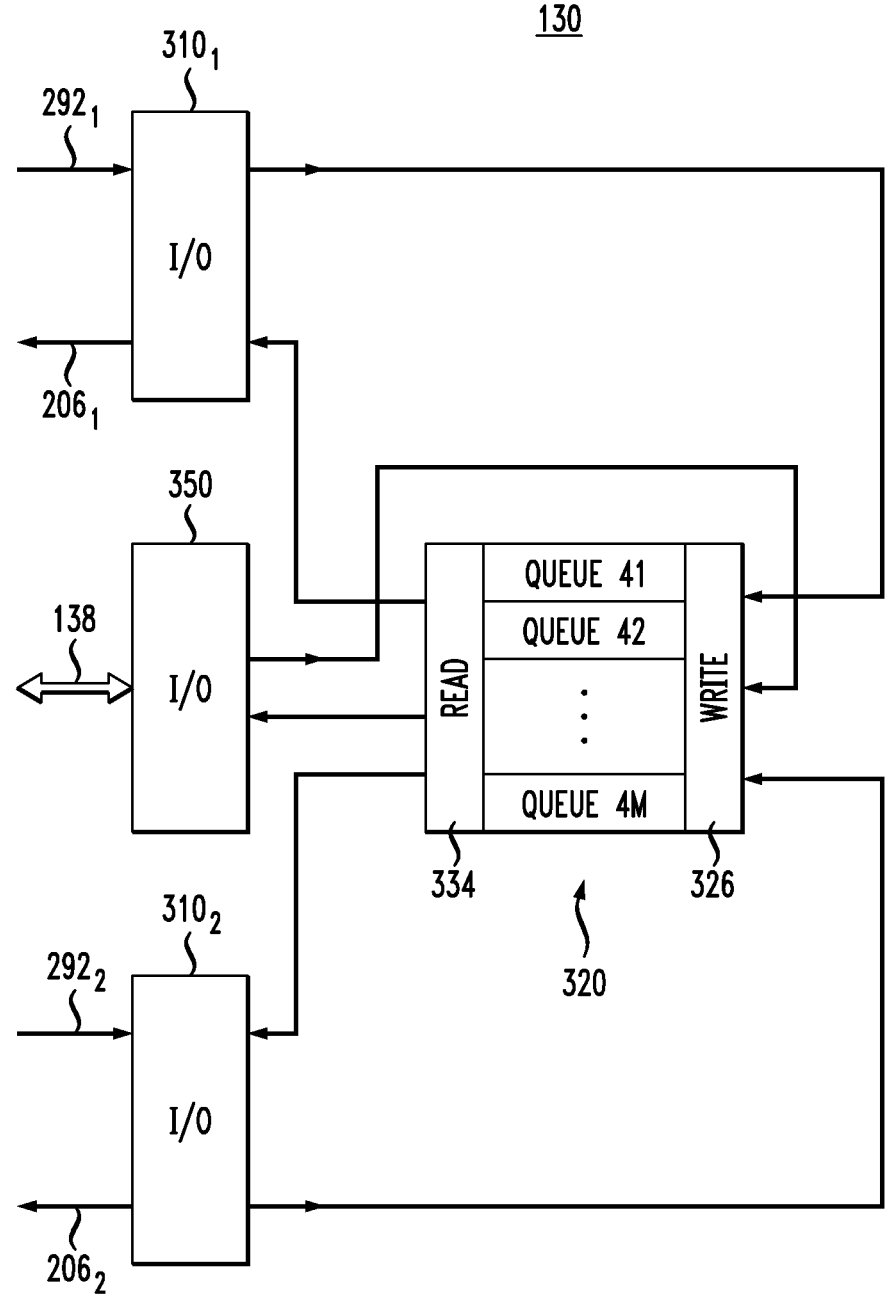

FIG. 3B shows a block diagram of interface circuit 130 according to an alternative embodiment. Interface circuit 130 of FIG. 3B differs from interface circuit 130 of FIG. 3A in that data buffer 320 has a single write circuit 326 and a single read circuit 334. Write circuit 326 can write, into any of queues 41, 42, . . . , 4M, the data received through any of I/O interfaces $310_1$, $310_2$, and 350, where M is an integer greater than two. Similarly, read circuit 334 can read from any of queues 41, 42, . . . , 4M and direct the read data to any of I/O interfaces $310_1$, $310_2$, and 350. In operation, each of queues 41, 42, . . . , 4M can be configured to queue data frames having a respective different destination address or set of destination addresses. In addition, one or more of queues 41, 42, . . . , 4M can be configured to receive data frames that are going to be discarded.

For example, if queue 41 corresponds to a destination address or set of destination addresses associated with optical transceiver $120_1$, then write circuit 326 can queue therein the data frames received both through I/O interface $310_2$ from optical transceiver $120_2$ and through I/O interface 350 from the data lanes connected to multi-pin connector 138/144. If queue 42 corresponds to a destination address or set of destination addresses associated with optical transceiver $120_2$, then write circuit 326 can queue therein the data frames received both through I/O interface $310_1$ from optical transceiver $120_1$ and through I/O interface 350 from the data lanes connected to multi-pin connector 138/144. If queue 4M corresponds to a destination address or set of destination addresses associated with the data lanes connected to multi-pin connector 138/144, then write circuit 326 can queue therein the data frames received both through I/O interface $310_1$ from optical transceiver $120_1$ and through I/O interface $310_2$ from optical transceiver $120_2$.

A person of ordinary skill in the art will understand that interface circuit 130 of FIG. 3B is capable of performing at least the same set of data-frame operations as those described above in reference to FIG. 3A.

For example, to implement a drop-and-continue operation for a data frame received through I/O interface $310_1$ from optical transceiver $120_1$, write circuit 326 can queue that data frame into a selected one of the queues 41, 42, . . . , 4M. Read circuit 334 can then de-queue that data frame from that queue by: (i) directing a first copy of the data frame through I/O interface 350 to the data lanes connected to electrical connector 138/144 and (ii) directing a second copy of the data frame through I/O interface $310_2$ to optical transceiver $120_2$.

As another example, interface circuit 130 of FIG. 3B can controllably discard data frames by (i) causing write circuit 326 to queue those data frames in a selected one of the queues 41, 42, . . . , 4M and (ii) causing read circuit 334 to de-queue those data frames from that queue without directing them anywhere.

As yet another example, interface circuit 130 of FIG. 3B can implement a broadcast operation by causing write circuit 326 to queue the data frame to be broadcasted in a selected one of the queues 41, 42, . . . , 4M. Read circuit 334 can then de-queue that data frame from that queue by: (i) directing a first copy of the data frame through I/O interface 350 to the data lanes connected to electrical connector 138/144, (ii) directing a second copy of the data frame through I/O interface $310_1$ to optical transceiver $120_1$, and (iii) directing a third copy of the data frame through I/O interface $310_2$ to optical transceiver $120_2$.

Figure 4:
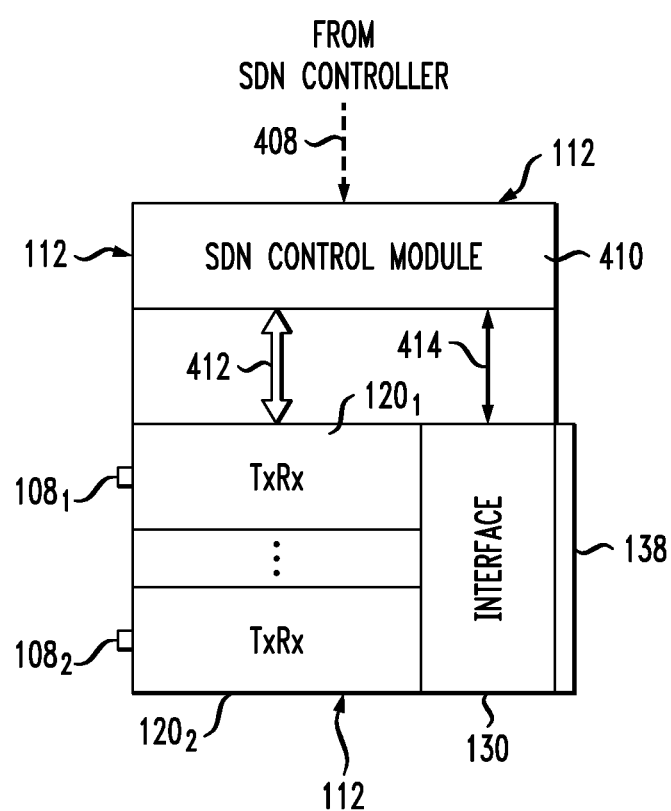
FIG. 4 shows a block diagram of a pluggable transceiver module that can be used in the network node of FIG. 1 according to another embodiment.

FIG. 4 shows a block diagram of a pluggable transceiver module 400 according to an embodiment. Pluggable transceiver module 400 represents a modification of pluggable transceiver module 110 shown in FIG. 1 and described above in reference to FIGS. 1-3. The changes implemented in pluggable transceiver module 400 enable this module to have flexible rates $R_1$, $R_2$, and $R_3$. Some embodiments of pluggable transceiver module 400 can be configurable to have, in different configurations thereof, the different sets of the example rates $R_1$, $R_2$, and $R_3$ described above in reference to FIG. 3A.

Similar to pluggable transceiver module 110 (FIG. 1), pluggable transceiver module 400 includes housing 112, optical transceivers $120_1$ and $120_2$, fiber connectors $108_1$ and $108_2$, interface circuit 130, and electrical connector 138, all of which have already been described above. In addition, pluggable transceiver module 400 includes an SDN control module 410, where SDN stands for software-defined networking. In operation, SDN control module 410 is capable of causing a change in the relevant configurations/operating parameters of optical transceivers $120_1$ and $120_2$ and interface circuit 130 in response to a control signal 408 received from an external SDN controller. This change can be effected by SDN control module 410, e.g., by way of control signals 412 and 414 applied to the optical transceivers and the interface circuit, respectively, as indicated in FIG. 4.

As used herein, the term "relevant configurations/operating parameters" refers to the settings (e.g., software-defined settings) of optical transceivers $120_1$ and $120_2$ and interface circuit 130 that affect the rates $R_1$, $R_2$, and $R_3$. Examples of such settings include, but are not limited to (i) the size of the operative constellation used in the processes of generating and decoding modulated optical signals handled by optical transceivers $120_1$ and $120_2$, (ii) the number of populated carrier wavelengths used by the optical transceivers, (iii) the electrical symbol rate used at the client side of interface circuit 130, and (iv) the electrical modulation format used at the client side of the interface circuit.

In various embodiments, the external SDN controller that generates control signal 408 can be located in network device 140, within network node 100, or at a different network location. Control signal 408 can be carried using an in-band channel, an out-of-band channel, or a combination thereof.

FIG. 5 shows a block diagram of an example optical network 500 in which pluggable transceiver module 400 (FIG. 4) can be used according to an embodiment. Network 500 is illustratively shown as comprising three network nodes that are labeled $502_A$, $502_B$, and $502_C$, respectively. In alternative embodiments, optical network 500 may comprise a different (from three) number of network nodes.

Each of network nodes $502_A$, $502_B$, and $502_C$ includes a respective network device (e.g., router or switch) 540 that is connected to the access or local-area network by way of a respective electrical data link 552. Each of network devices $540_A$, $540_B$, and $540_C$ has one or more respective electrical connection slots, each of which can accept a pluggable transceiver module that complies with the corresponding multi-source agreement. In general, network devices $540_A$, $540_B$, and $540_C$ can (i) differ from one another in the rate $R_3$ that they can support and/or (ii) be manufactured by different respective equipment manufacturers. The following description provides a non-limiting example of possible technical parameters of network devices $540_A$, $540_B$, and $540_C$ that is intended to better illustrate some of the benefits and/or advantages of the use, in network 500, of the pluggable transceiver module 400 disclosed herein.

In this example, each of network devices $540_A$ and $540_C$ is a conventional network device having one or more electrical connection slots designed to support the fixed electrical-interface rate $R_3$ of 100 Gb/s. Network device $540_B$ is a newer network device having one or more connection slots that support a flexible electrical-interface rate $R_3$ that can be selected from a rate interval, e.g., between 50 Gb/s and 500 Gb/s. Network device $540_A$ has an instance (nominal copy) of pluggable transceiver module 400 (labeled $400_A$) connected in one of its connection slots as indicated in FIG. 5. Network device $540_B$ has another instance of pluggable transceiver module 400 (labeled $400_B$) connected in one of its connection slots as further indicated in FIG. 5. Network device $540_C$ has two conventional fixed-rate (100G) optical transceiver modules $530_1$ and $530_2$ connected in its two connection slots as additionally indicated in FIG. 5.

An optical line $504_{AB}$ is connected between fiber connector $108_{2A}$ of pluggable transceiver module $400_A$ and fiber connector $108_{2B}$ of pluggable transceiver module $400_B$. An optical line $504_{BC}$ is connected between fiber connector $108_{1B}$ of pluggable transceiver module $400_B$ and fiber connector $508_1$ of pluggable transceiver module $530_1$. An optical line $504_{AC}$ is connected between fiber connector $108_{1A}$ of pluggable transceiver module $400_A$ and a fiber connector $508_2$ of pluggable transceiver module $530_2$.

An SDN controller 510 can use control signals $408_A$ and $408_B$ to cause pluggable transceiver modules $400_A$ and $400_B$ to have the settings that (i) are compatible with the specifications of the host connection slot and (ii) enable the optical-line rates for some of the optical lines 504 to be higher than those achievable with the use of conventional pluggable transceiver modules, such as pluggable transceiver modules 530.

For example, SDN controller 510 can use control signal $408_A$ to cause pluggable transceiver module $400_A$ to have the following full-duplex rates $R_1$, $R_2$, and $R_3$: $R_1$=100 Gb/s, $R_2$=200 Gb/s and $R_3$=100 Gb/s. Note that the rate $R_1$=100 Gb/s is set to accommodate the fixed (100G) rate supported by optical transceiver module $530_2$. Further note that the rate $R_3$=100 Gb/s is set to be compatible with the rate supported by the corresponding connection slot of network device $540_A$.

SDN controller 510 can similarly use control signal $408_B$ to cause pluggable transceiver module $400_B$ to have the following full-duplex rates $R_1$, $R_2$, and $R_3$: $R_1$=100 Gb/s, $R_2$=200 Gb/s, and $R_3$=300 Gb/s. Note that the rate $R_1$=100 Gb/s is set to accommodate the fixed (100G) rate supported by optical transceiver $530_1$. Further note that the rate $R_3$=300 Gb/s is set to the value of $R_3$=$R_1$+$R_2$ (also see Eq. (1)) to maximize, in the shown network configuration, the utilization of the throughput capacity supported by the corresponding connection slot of network device $540_B$.

As a result of the above-indicated configuration, optical lines $504_{AB}$, $504_{BC}$, and $504_{AC}$ in network 500 can carry the optical traffic having the following full-duplex rates: (i) 200 Gb/s for optical line $504_{AB}$; (ii) 100 Gb/s for optical line $504_{AC}$; and (iii) 100 Gb/s for optical line $504_{BC}$. In contrast, the use of conventional optical transceiver modules 530 instead of pluggable transceiver modules 400 in one or both of network nodes $502_A$ and $502_B$ would disadvantageously result in the full-duplex rate of only 100 Gb/s for optical line $504_{AB}$. A person of ordinary skill in the art will appreciate that the latter rate for optical line $504_{AB}$ causes the technical capabilities of network device $540_B$ to be underutilized to a greater extent than that in the above-described example configuration of network 500 shown in FIG. 5. It is also evident from the above-described example that the use of pluggable transceiver modules 400 in network 500 enables the network operator to implement an incremental upgrade of the network capacity during which the older network devices, such as network devices $540_A$ and $540_C$, are gradually replaced by newer network devices, such as network device $540_B$, without having to replace the corresponding pluggable transceiver modules at the same time. The latter is possible because embodiments of the pluggable transceiver modules 110 and 400 disclosed herein are compatible with both older and newer network devices.

According to an example embodiment disclosed above in reference to FIGS. 1-5, provided is an apparatus comprising a transceiver module (e.g., 110, FIG. 1; 400, FIG. 4) that comprises: a pluggable electrical connector (e.g., 138, FIG. 1); a first optical transceiver (e.g., $120_1$, FIGS. 1, 4) connectable to a first optical fiber or fiber-optic cable (e.g., $104_1$, FIG. 1; 504, FIG. 5); a second optical transceiver (e.g., $120_2$, FIGS. 1, 4) connectable to a second optical fiber or fiber-optic cable (e.g., $104_2$, FIG. 1; 504, FIG. 5); and an electrical interface circuit (e.g., 130, FIGS. 1, 3) electrically coupled between the first optical transceiver, the second optical transceiver, and the pluggable electrical connector, the electrical interface circuit being capable of: transferring data (e.g., one or more of data frames A, B, C, D described in reference to FIG. 3A) between the first optical transceiver and the pluggable electrical connector; transferring data (e.g., one or more of data frames A, B, C, D described in reference to FIG. 3A) between the second optical transceiver and the pluggable electrical connector; and transferring data (e.g., one or more of data frames A, B, C, D described in reference to FIG. 3A) between the first optical transceiver and the second optical transceiver without causing the data that are being transferred between the first optical transceiver and the second optical transceiver to go through the pluggable electrical connector.

In some embodiments of the above apparatus, the transceiver module further comprises a structural frame or housing (e.g., 112, FIG. 1) to which the pluggable electrical connector, the first optical transceiver, the second optical transceiver, and the interface circuit are fixedly attached.

In some embodiments of any of the above apparatus, the structural frame or housing has a form factor that complies with a multi-source agreement (such as one of the above-cited CFP, SFP, and QSFP agreements); and wherein the pluggable connector has a pin layout that complies with the multi-source agreement.

In some embodiments of any of the above apparatus, the electrical interface circuit is further capable of: transferring a first copy of a data frame from the first optical transceiver to the pluggable electrical connector; and transferring a second copy of the data frame from the first optical transceiver to the second optical transceiver.

In some embodiments of any of the above apparatus, the electrical interface circuit is further capable of: transferring a first copy of a data frame from the pluggable electrical connector to the first optical transceiver; and transferring a second copy of the data frame from the pluggable electrical connector to the second optical transceiver.

In some embodiments of any of the above apparatus, the electrical interface circuit is further capable of controllably discarding a data frame received from a selected one of the pluggable electrical connector, the first optical transceiver, and the second optical transceiver.

In some embodiments of any of the above apparatus, the first optical transceiver has a first fiber connector (e.g., $108_1$, FIG. 1) configured to accept an end of the first optical fiber or fiber-optic cable; and the second optical transceiver has a second fiber connector (e.g., $108_2$, FIG. 1) configured to accept an end of the second optical fiber or fiber-optic cable.

In some embodiments of any of the above apparatus, the electrical interface circuit comprises a data buffer (e.g., 320, FIG. 3) configured to temporarily store the data that are being transferred between the first optical transceiver and the pluggable electrical connector, between the second optical transceiver and the pluggable electrical connector, and between the first optical transceiver and the second optical transceiver.

In some embodiments of any of the above apparatus, the data buffer is configured to queue received data frames in a plurality of queues (e.g., 11, 12, ..., 1n, 21, 22, ..., 2m, 31, 32, ..., 3k, FIG. 3A; 41, 42, ..., 4M, FIG. 3B), each of the queues corresponding to a respective destination address or a set of destination addresses.

In some embodiments of any of the above apparatus, the data buffer is further configured to: cause a queue that corresponds to a destination address associated with the first optical transceiver to queue therein the data frames received both through the second optical transceiver and the pluggable electrical connector; cause a queue that corresponds to a destination address associated with the second optical transceiver to queue therein the data frames received both through the first optical transceiver and the pluggable electrical connector; and cause a queue that corresponds to a destination address associated with the pluggable electrical connector to queue therein the data frames received both through the first optical transceiver and the second optical transceiver.

In some embodiments of any of the above apparatus, the transceiver module further comprises a control circuit (e.g., 410, FIG. 4) configured to change one or more settings of one or more of the first optical transceiver, the second optical transceiver, and the electrical interface circuit in a manner that changes one or more of: an optical-line rate (e.g., $R_1$, Eqs. (1)-(2)) of the first optical transceiver; an optical-line rate (e.g., $R_2$, Eqs. (1)-(2)) of the second optical transceiver; and an electrical data rate (e.g., $R_3$, Eqs. (1)-(2)) of data transfer through the pluggable electrical connector.

In some embodiments of any of the above apparatus, the control circuit is further configured to change the one or more settings in response to a control signal (e.g., 408, FIG. 4) received from an electronic controller (e.g., 510, FIG. 5) that is external to the transceiver module.

In some embodiments of any of the above apparatus, the transceiver module is further configured to cause the electrical data rate to be changeable within a rate interval between 50 Gb/s and 500 Gb/s.

In some embodiments of any of the above apparatus, the transceiver module is configured to support data rates that satisfy the following inequality:

$$R_1+R_2>R_3,$$

where $R_1$ is an optical-line rate of the first optical transceiver, $R_2$ is an optical-line rate of the second optical transceiver, and $R_3$ is an electrical data rate of data transfer through the pluggable electrical connector.

In some embodiments of any of the above apparatus, the apparatus further comprises a network device (e.g., 140, FIG. 1) having a matching electrical connector (e.g., $144_1$, FIG. 1) mated with the pluggable electrical connector in a manner that enables the transceiver module to be reversibly detachable therefrom.

In some embodiments of any of the above apparatus, the network device comprises a plurality of electrical data lanes (e.g., 146, FIG. 1) connected to the matching electrical connector and configured to transmit the data transferred through the pluggable electrical connector and the matching electrical connector between the transceiver module and the network device.

In some embodiments of any of the above apparatus, the network device further comprises a switch fabric (e.g., 150, FIG. 1) configured to variously route the data between the plurality of electrical data lanes and one or more other circuits (e.g., 148, 152, FIG. 1) of the network device.

In some embodiments of any of the above apparatus, the network device comprises: a first connection slot (e.g., $142_1$, FIG. 1) having the matching electrical connector fixedly mounted therein and a form factor that matches a form factor of the transceiver module; and at least a second connection slot (e.g., $142_2$, FIG. 1) having a nominal copy (e.g., $144_2$, FIG. 1) of the matching electrical connector and a form factor that matches the form factor of the transceiver module.

In some embodiments of any of the above apparatus, the apparatus further comprises: the first optical fiber or fiber-optic cable (e.g., $104_1$, FIG. 1) connected to the first optical transceiver; and the second optical fiber or fiber-optic cable (e.g., 104₂, FIG. 1) connected to the second optical transceiver.

In some embodiments of any of the above apparatus, the first optical transceiver comprises a first optical receiver (e.g., a first instance of 290, FIG. 2) connectable to the first optical fiber or fiber-optic cable and a first optical transmitter (e.g., a first instance of 210, FIG. 2) connectable to the first optical fiber or fiber-optic cable; and the second optical transceiver comprises a second optical receiver (e.g., a second instance of 290, FIG. 2) connectable to the second optical fiber or fiber-optic cable and a second optical transmitter (e.g., a second instance of 210, FIG. 2) connectable to the second optical fiber or fiber-optic cable.

According to another example embodiment disclosed above in reference to FIGS. 1-5, provided is an apparatus comprising: an electrical switch fabric (e.g., 150₁, FIG. 1); a first optical transceiver (e.g., 120₁, FIGS. 1, 4) connectable to a first optical fiber or fiber-optic cable (e.g., 104₁, FIG. 1; 504, FIG. 5); a second optical transceiver (e.g., 120₂, FIGS. 1, 4) connectable to a second optical fiber or fiber-optic cable (e.g., 104₂, FIG. 1; 504, FIG. 5); and an electrical interface circuit (e.g., 130, FIGS. 1, 3) electrically coupled between the first optical transceiver, the second optical transceiver, and the electrical switch fabric, the electrical interface circuit being capable of: transferring data (e.g., one or more of data frames A, B, C, D described in reference to FIG. 3A) between the first optical transceiver and the electrical switch fabric; transferring data (e.g., one or more of data frames A, B, C, D described in reference to FIG. 3A) between the second optical transceiver and the electrical switch fabric; and transferring data (e.g., one or more of data frames A, B, C, D described in reference to FIG. 3A) between the first optical transceiver and the second optical transceiver without causing the data that are being transferred between the first optical transceiver and the second optical transceiver to go through the electrical switch fabric.

According to yet another example embodiment disclosed above in reference to FIGS. 1-5, provided is an apparatus comprising: a collection of one or more client network ports (e.g., 138/144, FIG. 1); an optical receiver (e.g., 290 of 120₁, FIGS. 1-2) configured to receive data from a first optical fiber (e.g., 104₁, FIG. 1); an optical transmitter (e.g., 210 of 120₂, FIGS. 1-2) configured to transmit data to a second optical fiber (e.g., 104₂, FIG. 1); and an electrical interface circuit (e.g., 130, FIG. 1) electrically connected to communicatively couple the optical receiver, the optical transmitter, and the collection of one or more client network ports; and wherein the electrical interface circuit is configured to electrically route a part of the data received at the optical receiver from the first optical fiber on a single optical wavelength channel to the collection of one or more client network ports and to electrically route another part of the data received from the first optical fiber at the optical receiver on the same single optical wavelength channel to the optical transmitter.

In some embodiments of the above apparatus, the electrical interface circuit is configured to electrically route some data received at the collection of one or more client network ports to the optical transmitter such that the optical transmitter optically transmits the another part of the data and said some data together on a single optical wavelength channel.

In some embodiments of any of the above apparatus, the electrical interface circuit is configured to electrically route said some data and the another part of the data such that the optical transmitter time division multiplexes the another part of the data and said some data together for transmission on the single optical wavelength channel.

In some embodiments of any of the above apparatus, the collection of one or more client network ports is capable of transmitting data at a combined data rate, the combined data rate being lower than a data rate at which the optical receiver is configured to receive data from the first optical fiber on the single optical wavelength channel.

In some embodiments of any of the above apparatus, the electrical interface circuit comprises a data buffer (e.g., 320, FIG. 3) configured to temporarily store the part of the data and the another part of the data in different respective queues (e.g., selected from 11, 12, . . . , 1n, 21, 22, . . . , 2m, 31, 32, . . . , 3k, FIG. 3A; 41, 42, . . . , 4M, FIG. 3B), each corresponding to a respective destination address or a respective set of destination addresses.

While this disclosure includes references to illustrative embodiments, this specification is not intended to be construed in a limiting sense.

Although various embodiments have described herein in reference to pluggable transceiver modules 110, the invention(s) disclosed herein are not so limited. In some embodiments, one or more modified transceiver modules 110 can be incorporated into network device 140 in a non-pluggable manner, e.g., by being fixedly connected/attached to the same motherboard or circuit board that hosts switch fabric(s) 150.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a transceiver module that comprises:
    a pluggable electrical connector;
    a first optical transceiver connectable to a first optical fiber or fiber-optic cable;
    a second optical transceiver connectable to a second optical fiber or fiber-optic cable; and
    an electrical interface circuit electrically coupled between the first optical transceiver, the second optical transceiver, and the pluggable electrical connector, the electrical interface circuit being capable of:
        transferring data between the first optical transceiver and the pluggable electrical connector;
        transferring data between the second optical transceiver and the pluggable electrical connector; and
        transferring data between the first optical transceiver and the second optical transceiver without causing the data that are being transferred between the first optical transceiver and the second optical transceiver to go through the pluggable electrical connector.

2. The apparatus of claim 1, wherein the transceiver module further comprises a structural frame or housing to which the pluggable electrical connector, the first optical transceiver, the second optical transceiver, and the interface circuit are fixedly attached.

3. The apparatus of claim 2,
    wherein the structural frame or housing has a form factor that complies with a multi-source agreement; and
    wherein the pluggable connector has a pin layout that complies with the multi-source agreement.

4. The apparatus of claim 1, wherein the electrical interface circuit is further capable of:
    transferring a first copy of a data frame from the first optical transceiver to the pluggable electrical connector; and
    transferring a second copy of the data frame from the first optical transceiver to the second optical transceiver.

5. The apparatus of claim 1, wherein the electrical interface circuit is further capable of:
    transferring a first copy of a data frame from the pluggable electrical connector to the first optical transceiver; and
    transferring a second copy of the data frame from the pluggable electrical connector to the second optical transceiver.

6. The apparatus of claim 1, wherein the electrical interface circuit is further capable of controllably discarding a data frame received from a selected one of the pluggable electrical connector, the first optical transceiver, and the second optical transceiver.

7. The apparatus of claim 1, wherein:
    the first optical transceiver has a first fiber connector configured to accept an end of the first optical fiber or fiber-optic cable; and
    the second optical transceiver has a second fiber connector configured to accept an end of the second optical fiber or fiber-optic cable.

8. The apparatus of claim 1, wherein the electrical interface circuit comprises a data buffer configured to temporarily store the data that are being transferred between the first optical transceiver and the pluggable electrical connector, between the second optical transceiver and the pluggable electrical connector, and between the first optical transceiver and the second optical transceiver.

9. The apparatus of claim 8, wherein the data buffer is configured to queue received data frames in a plurality of queues, each of the queues corresponding to a respective destination address or a respective set of destination addresses.

10. The apparatus of claim 9, wherein the data buffer is further configured to:
    cause a queue that corresponds to a destination address associated with the first optical transceiver to queue therein the data frames received both through the second optical transceiver and the pluggable electrical connector;
    cause a queue that corresponds to a destination address associated with the second optical transceiver to queue therein the data frames received both through the first optical transceiver and the pluggable electrical connector; and
    cause a queue that corresponds to a destination address associated with the pluggable electrical connector to queue therein the data frames received both through the first optical transceiver and the second optical transceiver.

11. The apparatus of claim 1, wherein the transceiver module further comprises a control circuit configured to change one or more settings of one or more of the first optical transceiver, the second optical transceiver, and the electrical interface circuit in a manner that changes one or more of:
   an optical-line rate of the first optical transceiver;
   an optical-line rate of the second optical transceiver; and
   an electrical data rate of data transfer through the pluggable electrical connector.

12. The apparatus of claim 11, wherein the control circuit is further configured to change the one or more settings in response to a control signal received from an electronic controller that is external to the transceiver module.

13. The apparatus of claim 11, wherein the transceiver module is further configured to cause the electrical data rate to be changeable within a rate interval between 50 Gb/s and 500 Gb/s.

14. The apparatus of claim 1, wherein the transceiver module is configured to support data rates that satisfy the following inequality:

$$R_1+R_2>R_3,$$

where $R_1$ is an optical-line rate of the first optical transceiver, $R_2$ is an optical-line rate of the second optical transceiver, and $R_3$ is an electrical data rate of data transfer through the pluggable electrical connector.

15. The apparatus of claim 1, further comprising a network device having a matching electrical connector mated with the pluggable electrical connector in a manner that enables the transceiver module to be reversibly detachable therefrom.

16. The apparatus of claim 15, wherein the network device comprises a plurality of electrical data lanes connected to the matching electrical connector and configured to transmit the data transferred through the pluggable electrical connector and the matching electrical connector between the transceiver module and the network device.

17. The apparatus of claim 16, wherein the network device further comprises a switch fabric configured to variously route the data between the plurality of electrical data lanes and one or more other circuits of the network device.

18. The apparatus of claim 15, wherein the network device comprises:
   a first connection slot having the matching electrical connector fixedly mounted therein and a form factor that matches a form factor of the transceiver module; and
   at least a second connection slot having a nominal copy of the matching electrical connector and a form factor that matches the form factor of the transceiver module.

19. The apparatus of claim 1,
   wherein the first optical transceiver comprises a first optical receiver connectable to the first optical fiber or fiber-optic cable, and a first optical transmitter connectable to the first optical fiber or fiber-optic cable; and
   wherein the second optical transceiver comprises a second optical receiver connectable to the second optical fiber or fiber-optic cable, and a second optical transmitter connectable to the second optical fiber or fiber-optic cable.

20. An apparatus comprising:
   an electrical switch fabric;
   a first optical transceiver connectable to a first optical fiber or fiber-optic cable;
   a second optical transceiver connectable to a second optical fiber or fiber-optic cable; and
   an electrical interface circuit electrically coupled between the first optical transceiver, the second optical transceiver, and the electrical switch fabric, the electrical interface circuit being capable of:
      transferring data between the first optical transceiver and the electrical switch fabric;
      transferring data between the second optical transceiver and the electrical switch fabric; and
      transferring data between the first optical transceiver and the second optical transceiver without causing the data that are being transferred between the first optical transceiver and the second optical transceiver to go through the electrical switch fabric.

21. An apparatus, comprising:
   a collection of one or more client network ports;
   an optical receiver configured to receive data from a first optical fiber;
   an optical transmitter configured to transmit data to a second optical fiber; and
   an electrical interface circuit electrically connected to communicatively couple the optical receiver, the optical transmitter, and the collection of one or more client network ports; and
   wherein the electrical interface circuit is configured to electrically route a part of the data received at the optical receiver from the first optical fiber on a single optical wavelength channel to the collection of one or more client network ports and to electrically route another part of the data received from the first optical fiber at the optical receiver on the same single optical wavelength channel to the optical transmitter.

22. The apparatus of claim 21, wherein the collection of one or more client network ports is capable of transmitting data at a combined data rate, the combined data rate being lower than a data rate at which the optical receiver is configured to receive data from the first optical fiber on the single optical wavelength channel.

23. The apparatus of claim 21,
   wherein the electrical interface circuit is configured to electrically route some data received at the collection of one or more client network ports to the optical transmitter such that the optical transmitter optically transmits the another part of the data and said some data together on a single optical wavelength channel.

24. The apparatus of claim 23,
   wherein the electrical interface circuit is configured to electrically route said some data and the another part of the data such that the optical transmitter time division multiplexes the another part of the data and said some data together for transmission on the single optical wavelength channel.

25. The apparatus of claim 23, wherein the collection of one or more client network ports is capable of transmitting data at a combined data rate, the combined data rate being lower than a data rate at which the optical receiver is configured to receive data from the first optical fiber on the single optical wavelength channel.

26. The apparatus of claim 21, wherein the electrical interface circuit comprises a data buffer configured to temporarily store the part of the data and the another part of the data in different respective queues, each corresponding to a respective destination address or a respective set of destination addresses.

* * * * *